United States Patent
Schoenherr

(10) Patent No.: US 10,680,297 B2
(45) Date of Patent: Jun. 9, 2020

(54) TAB COOLING FOR POUCH CELL

(71) Applicant: GM GLOBAL TECHNOLOGY OPERATIONS LLC, Detroit, MI (US)

(72) Inventor: Robert J. Schoenherr, Oxford, MI (US)

(73) Assignee: GM Global Technology Operations LLC, Detroit, MI (US)

(*) Notice: Subject to any disclaimer, the term of this patent is extended or adjusted under 35 U.S.C. 154(b) by 220 days.

(21) Appl. No.: 15/658,185

(22) Filed: Jul. 24, 2017

(65) Prior Publication Data

US 2019/0027795 A1  Jan. 24, 2019

(51) Int. Cl.
| | |
|---|---|
| *H01M 10/625* | (2014.01) |
| *H01M 10/0525* | (2010.01) |
| *H01M 10/647* | (2014.01) |
| *H01M 10/653* | (2014.01) |
| *H01M 10/6556* | (2014.01) |
| *B60L 50/64* | (2019.01) |
| *H01M 10/613* | (2014.01) |
| *H01M 10/654* | (2014.01) |
| *B60L 58/26* | (2019.01) |
| *H01M 10/0585* | (2010.01) |

(52) U.S. Cl.
CPC .......... *H01M 10/625* (2015.04); *B60L 50/64* (2019.02); *B60L 58/26* (2019.02); *H01M 10/0525* (2013.01); *H01M 10/613* (2015.04); *H01M 10/647* (2015.04); *H01M 10/653* (2015.04); *H01M 10/654* (2015.04); *H01M 10/6556* (2015.04); *H01M 10/0585* (2013.01); *H01M 2220/20* (2013.01)

(58) Field of Classification Search
CPC .......... H01M 10/625; H01M 10/0525; H01M 10/647; H01M 10/6556; H01M 10/653; H01M 2220/20
See application file for complete search history.

(56) References Cited

U.S. PATENT DOCUMENTS

2010/0330422 A1* 12/2010 Kim .................. H01M 4/661
 429/220

FOREIGN PATENT DOCUMENTS

JP  2012-174971  *  9/2012  ............ H01M 10/50

* cited by examiner

*Primary Examiner* — Osei K Amponsah
(74) *Attorney, Agent, or Firm* — Quinn IP Law

(57) ABSTRACT

A lithium-ion pouch battery cell includes a plurality of electrodes stacked together to form an electrode stack. Each of the electrodes includes a main electrode layer and an electrode tab protruding from the main electrode layer. The electrode stack has a tab surface area, and the main electrode layer has a main surface area. The lithium-ion pouch battery cell further includes a heat-rejecting lead tab coupled to the plurality of electrodes. The heat-rejecting lead tab covers the tab surface area of the electrode tab and the main surface area of the main electrode layer to facilitate heat transfer from the electrode stack to the heat-rejecting lead tab.

20 Claims, 6 Drawing Sheets

US 10,680,297 B2

TAB COOLING FOR POUCH CELL

INTRODUCTION

The present disclosure relates to tab cooling for pouch cells.

Some vehicles include batteries for propulsion. For instance, hybrid electric vehicles (HEVs) and purely electric vehicles (EVs) include batteries. These batteries can passively store electrical energy. The flow of electric current to and from the individual cells (i.e., a single electrochemical unit) is such that when several such cells are combined into successively larger assemblies (such as modules and packs), the current or voltage can be increased to generate the desired power output. In the present context, larger module and pack assemblies are made up of one or more cells joined in series (for increased voltage), parallel (for increased current) or both, and may include additional structure to ensure proper installation and operation of these cells.

SUMMARY

In the present disclosure, the lithium-ion pouch battery cell includes a cell tab with a modified profile to encompass most or the entire face of the electrode stack to reject heat in a direct face cooling plate configuration. In particular, the presently disclosed pouch cell allows for direct tab cooling via the tab and enables both in-place heat flux path and through-plane heat flux path to facilitate effective cooling of the cell during a fast charge event. This tab is welded to the electrodes, and the cell assembly is minimally affected. Further, the cell assembly sequence is unaffected, and the design of other cell components are unaffected as well. It is envisioned that the presently disclosed cell tab may be incorporated to battery cells other than lithium-ion battery cells.

In certain aspects of the present disclosure, the lithium-ion pouch battery cell includes a plurality of electrodes stacked together to form an electrode stack. Each of the electrodes includes a main electrode layer and an electrode tab protruding from the main electrode layer. The electrode tab has a tab surface area, and the main electrode layer has a main surface area. The lithium-ion pouch battery further includes a heat-rejecting lead tab coupled to the plurality of electrodes. The heat-rejecting lead tab covers the tab surface area of the electrode tab and the main surface area of the main electrode layer to facilitate heat transfer from the electrode stack to the heat-rejecting lead tab. The heat-rejecting lead tab includes a main lead body and a heat-rejecting protrusion coupled to the main lead body. The heat-rejecting protrusion covers an entirety of the tab surface area of the electrode tab to facilitate heat transfer from the electrode stack to the heat-rejecting lead tab. The heat-rejecting lead tab comprises a thermally-conductive material. The main lead body covers a majority of the main surface area of the main electrode layer to facilitate heat transfer from the electrode stack to the heat-rejecting lead tab. The electrodes include an innermost electrode and an outermost electrode opposite the innermost electrode, and the heat-rejecting lead tab is closer to the innermost electrode than to the outermost electrode. The heat-rejecting lead tab is directly coupled to the electrode tab of one of the plurality of electrodes. The heat-rejecting protrusion of the heat-rejecting lead tab is directly coupled to the electrode tab of one of the plurality of electrodes. The heat-rejecting protrusion is welded to the electrode tab of one of the plurality of electrodes, the heat-rejecting protrusion protrudes directly from the main lead body, and the electrode tab protrudes directly from the main electrode layer. The heat-rejecting protrusion has a planar configuration to facilitate heat transfer from the electrode stack to the heat-rejecting lead tab. The main lead body has a planar configuration to facilitate heat transfer from the electrode stack to the heat-rejecting lead tab.

The present disclosure also describes a battery assembly including a cooling plate and a lithium-ion pouch battery cell in thermal communication with the cooling plate. The lithium-ion battery cell includes a plurality of electrodes stacked together to form an electrode stack. Each of the electrodes includes a main electrode layer and an electrode tab protruding from the main electrode layer. The electrode tab has a tab surface area, and the main electrode layer has a main surface area. The lithium-ion pouch battery cell further includes a heat-rejecting lead tab coupled to the plurality of electrodes. The heat-rejecting lead tab covers the tab surface area of the electrode tab and the main surface area of the main electrode layer to facilitate heat transfer from the electrode stack to the heat-rejecting lead tab. The heat-rejecting lead tab includes a main lead body and a heat-rejecting protrusion coupled to the main lead body, and the heat-rejecting protrusion covers an entirety of the tab surface area of the electrode tab to facilitate heat transfer from the electrode stack to the heat-rejecting lead tab. The heat-rejecting lead tab comprises a thermally-conductive material. The main lead body covers a majority of the main surface area of the main electrode layer to facilitate heat transfer from the electrode stack to the heat-rejecting lead tab. The electrodes include an innermost electrode and an outermost electrode opposite the innermost electrode. The heat-rejecting lead tab is closer to the innermost electrode than to the outermost electrode. The heat-rejecting lead tab is directly coupled to the electrode tab of one of the plurality of electrodes. The heat-rejecting protrusion of the heat-rejecting lead tab is directly coupled to the electrode tab of one of the plurality of electrodes. The heat-rejecting protrusion is welded to the electrode tab of one of the plurality of electrodes. The heat-rejecting protrusion protrudes directly from the main lead body, and the electrode tab protrudes directly from the main electrode layer. The heat-rejecting protrusion has a planar configuration to facilitate heat transfer from the electrode stack to the heat-rejecting lead tab. The main lead body has a planar configuration to facilitate heat transfer from the electrode stack to the heat-rejecting lead tab. The cooling plate defines a channel configured to receive a coolant. The heat-rejecting lead tab is disposed between the cooling plate and the electrode stack to facilitate heat transfer from the electrode stack to the cooling plate through the heat-rejecting lead tab. The heat-rejecting lead tab is closer to the innermost electrode than to the outermost electrode. The cooling plate is closer to the innermost electrode than to the outermost electrode. The main surface area is greater than the tab surface area. The plurality of electrodes is a plurality of anode electrodes. The main electrode layer is a main anode layer, and the electrode tab is an anode tab. The lithium-ion pouch battery cell further includes a plurality of cathode electrodes. Each of the cathode electrodes includes a main cathode layer and a cathode tab protruding from the main cathode layer. The anode tab is spaced apart from the cathode tab along a first direction. The innermost electrode is spaced apart from the outermost electrode along a second direction. The second direction is perpendicular to the first direction. The electrode stack defines a first stack end and a second stack end opposite the first stack end. The first stack end is spaced apart from the second stack end along a third direction. The third direction is perpendicular to the first direction. The third direction is perpendicular to the second direction. The cathode tab is closer to the first stack end than to the second stack end. The anode tab is closer to the first stack end than to the second stack end. The lithium-ion pouch battery cell further includes a pouch enclosing the electrode stack.

The present disclosure also describes a vehicle including a plurality of wheels and an electric motor mechanically coupled to at least one of the plurality of wheels. The vehicle further includes a battery assembly electrically connected to the electric motor. The battery assembly includes a cooling plate and a lithium-ion pouch battery cell in thermal communication with the cooling plate. The lithium-ion pouch battery cell includes a plurality of electrodes stacked together to form an electrode stack. Each of the electrodes includes a main electrode layer and an electrode tab protruding from the main electrode layer. The electrode tab has a tab surface area, and the main electrode layer has a main surface area. The battery cell further includes a heat-rejecting lead tab coupled to the plurality of electrodes. The heat-rejecting lead tab covers the tab surface area of the electrode tab and the main surface area of the main electrode layer to facilitate heat transfer from the electrode stack to the heat-rejecting lead tab. The heat-rejecting lead tab includes a main lead body and a heat-rejecting protrusion coupled to the main lead body, and the heat-rejecting protrusion covers an entirety of the tab surface area of the electrode tab to facilitate heat transfer from the electrode stack to the heat-rejecting lead tab. The heat-rejecting lead tab comprises a thermally-conductive material, and the main lead body covers a majority of the main surface area of the main electrode layer to facilitate heat transfer from the electrode stack to the heat-rejecting lead tab. The electrodes include an innermost electrode and an outermost electrode opposite the innermost electrode, and the heat-rejecting lead tab is closer to the innermost electrode than to the outermost electrode.

The above features and advantages and other features and advantages of the present disclosure are readily apparent from the following detailed description of the best modes for carrying out the disclosure when taken in connection with the accompanying drawings.

DETAILED DESCRIPTION

Figure 1:
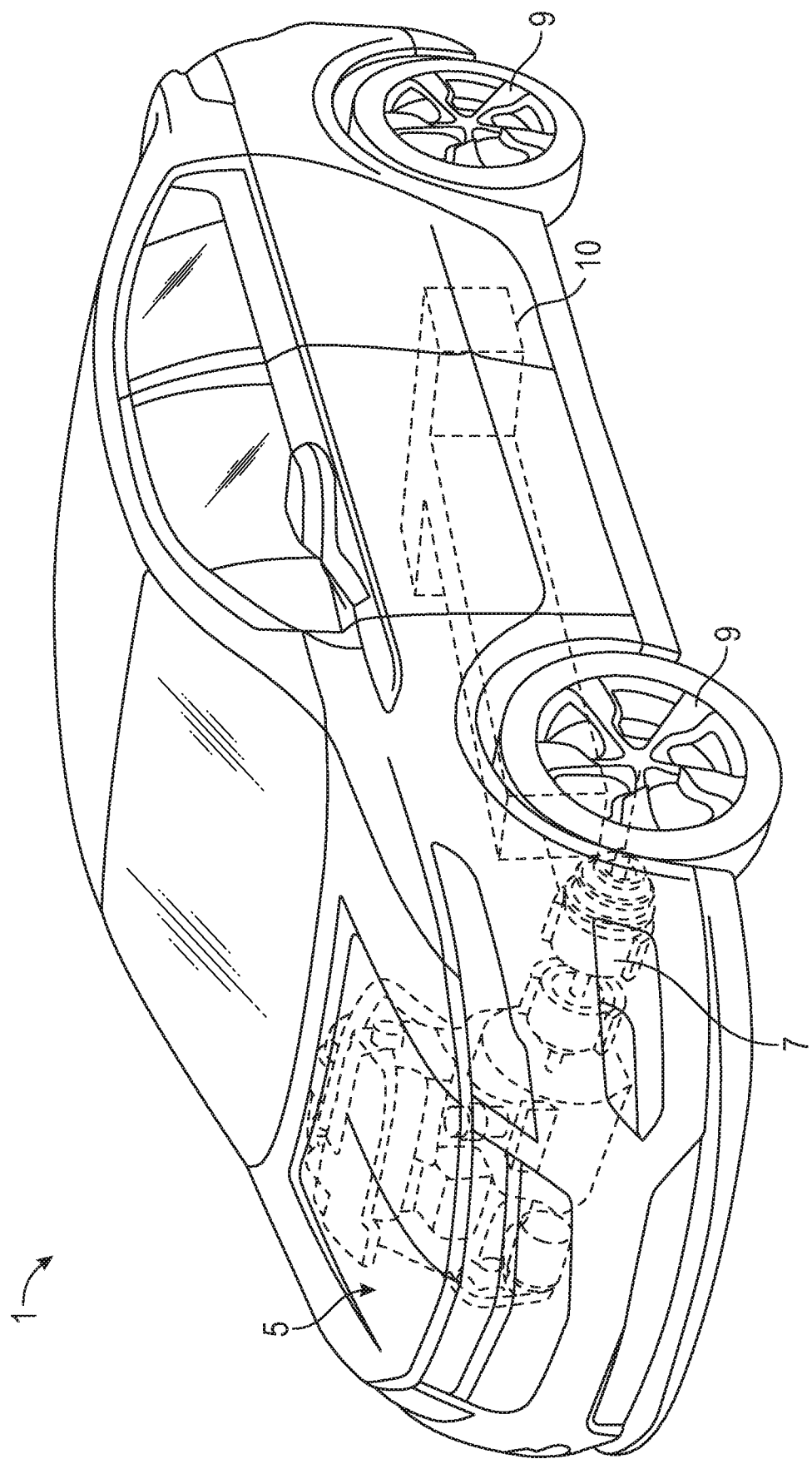
FIG. 1 is a schematic perspective view of a vehicle including a battery assembly and an electric motor electrically connected to the battery assembly.

Referring first to FIG. 1, a vehicle 1 includes a hybrid propulsion system in the form of an electric power source made up of an internal combustion engine (ICE) 5 and a battery assembly 10, both cooperative with one or more electric motors 7 and transmission (for example, in the form of a planetary gear set). The vehicle 1 includes one or more wheels 9. The electric motor 7 is mechanically coupled to wheels 9 (through a transmission). Accordingly, the electric motor 7 can propel the vehicle 1. Such a vehicle is recognized as a hybrid electric vehicle (HEV). The vehicle 1 may not require an ICE 5; in such case, rather than being an HEV, the vehicle 1 is an electric vehicle (EV). The battery assembly may either be in the power battery pack or energy battery pack form, the particular variant becoming apparent from the context. Additional drivetrain components (none of which are shown) useful in providing propulsive power to one or more of the wheels 9 and coupled to one or both of the battery assembly 10 and ICE 5 are understood to include rotating shafts, axles, controllers or the like. While the vehicle 1 is presently shown as a car, the applicability of the hybrid propulsion system to other such automotive forms (including trucks, buses, aircraft, watercraft, spacecraft and motorcycles) is deemed to be within the scope of the present disclosure.

Figure 2:
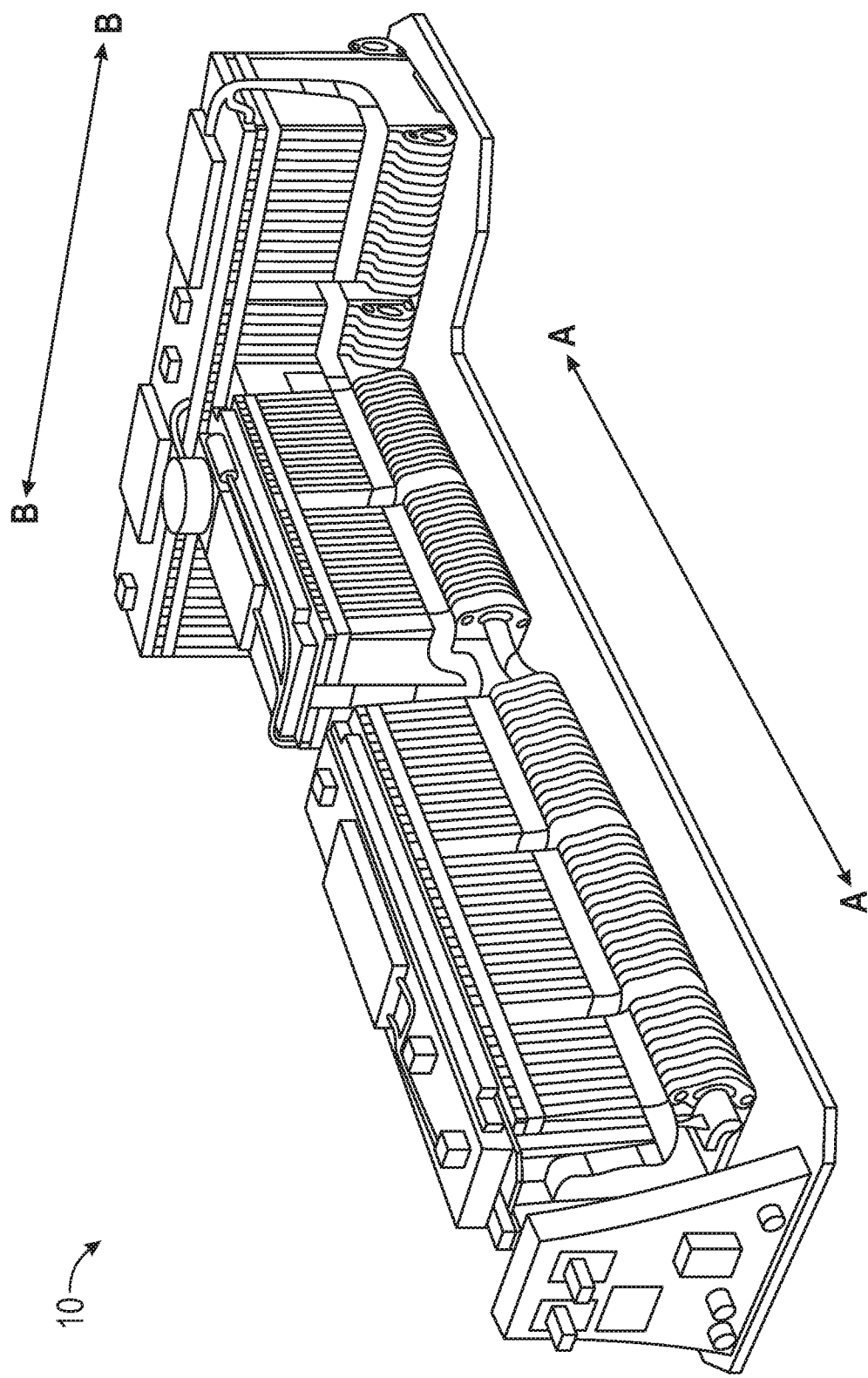
FIG. 2 is a schematic perspective view of the battery assembly shown in FIG. 1.
Figure 3:
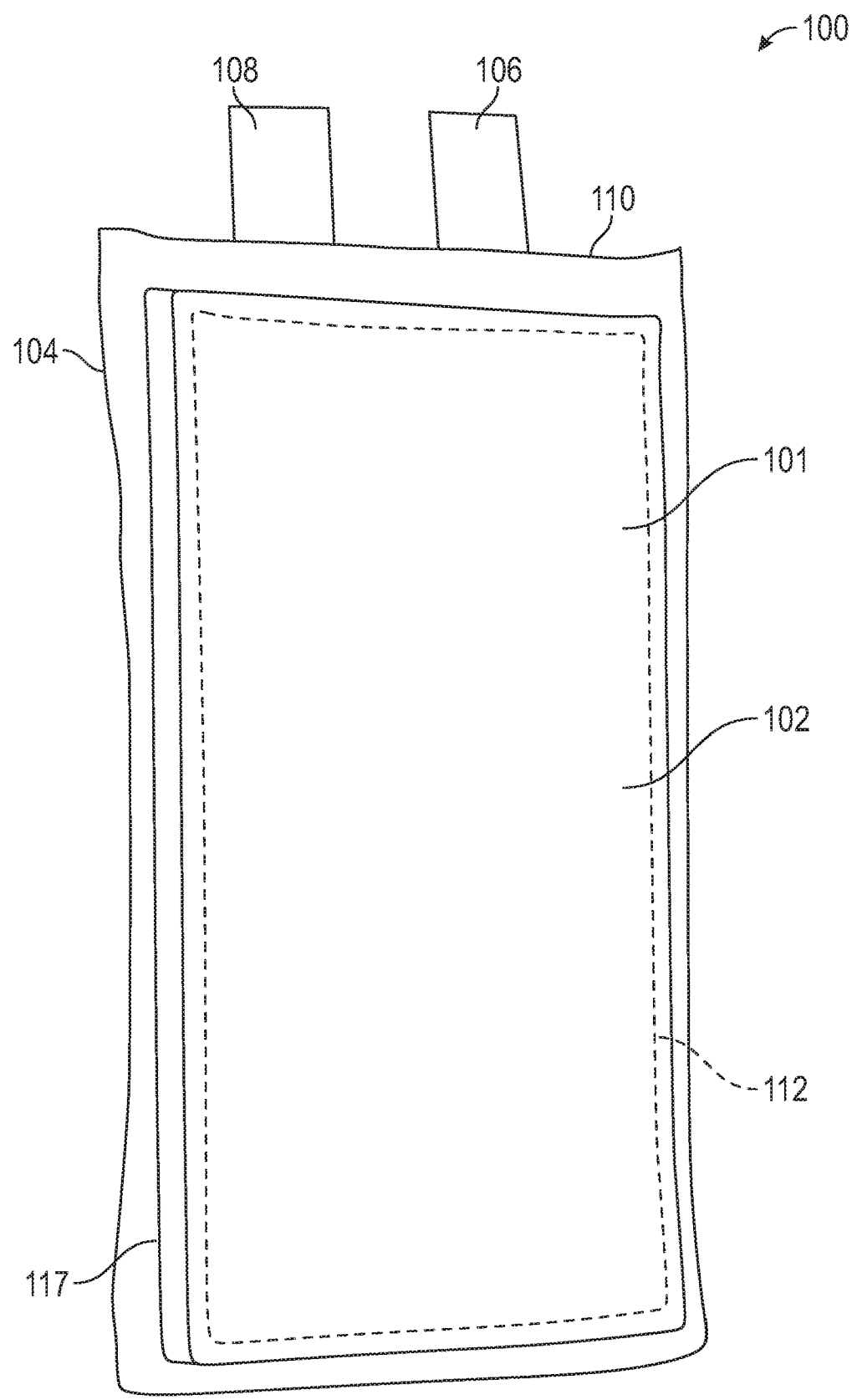
FIG. 3 is a schematic perspective view of a lithium-ion pouch battery cell of the battery assembly shown in FIG. 2.

Referring next to FIGS. 1-3, the battery assembly 10 is electrically connected to the electric motor 7 and is the electric current source for the vehicle 1 and the electric motor 7. The battery assembly 10 is in the form of numerous prismatic pouch lithium-ion battery cells 100 (FIG. 3) that are aligned in a facing arrangement (much like a deck of cards) along stacking direction, dimension or axes A-A and B-B. The dual nature of the stacking axes depicted are unique to the T-shaped nature of the battery assembly 10 and that in variants (not shown) where all of the battery cells 100 are aligned along a single common axis (such as axis A-A), reference to such additional stacking axes is not required. As with the additional drivetrain components discussed above, other equipment for integration of the battery assembly 10 into the vehicle 1 may include (among others) a battery system monitor (BSM) unit and a manual service disconnect (MSD) unit, as well as a battery disconnect unit (BDU) and ancillary structure for electrical control, structural support, cooling, electrical connectivity (via busbars and cables, for example) or the like. In the energy battery form shown, the individual battery cells 100 that make up battery assembly 10 are configured as rectangular (i.e., prismatic) pouches 101 with joined generally planar surfaces 102, 104. Positive and negative terminals in the form of projecting tabs 106, 108 may be situated on one edge 110 (shown presently as the top edge in FIG. 3) of the pouch 101 exterior to act as electrical contacts for connection (via busbar, for example) to an outside load or circuit. In another form, the tabs 106, 108 may extend from opposing edges of the pouch-shaped containment (such as shown in FIG. 3). As discussed in detail below, the tab 108 is referred herein as the heat-rejecting protrusion. However, alternatively or additionally, the tab 106 may be referred to as the heat-rejecting lead tab. The choice of tab 106, 108 location is dictated by the space available within the automotive environment, as well as preferred placement of the current-collecting busbars or related power cabling. Furthermore, in the present context, the edge is that region of the pouch 101 that is defined by and around a seam 117 where the adhesive or related joining of the opposing surfaces 102, 104 takes place. It will be appreciated by those skilled in the art that in the case of a prismatic lithium-ion pouch battery cell 100, such joining will define four edges, and that to minimize diffusion and related gas permeability, a substantial entirety of all four edges will need to be treated in the manner disclosed herein, keeping in mind that the regions immediately adjacent the projecting tabs 106, 108 may not have as much barrier layer coating continuity as where no such projections are present. As will be discussed in more detail below, seam 117 is the location between the joined opposing surfaces 102, 104.

With reference to FIG. 3, the lithium-ion pouch battery cell 100 define a stack type of internal electrode stack 112 that is entirely enclosed within flexible pouch 101. The flexible pouch 101 that in one form has its surfaces 102, 104 made of an aluminum foil with a protective polymer coating. Within the pouch 101, a number of sheet-shaped negative carbon-based electrodes (anodes, not shown) are connected to one of the tabs 106 and a number of sheet-shaped positive manganese-based storage electrodes (cathodes, not shown) are connected to the other of the tabs 108; these electrodes are stacked with an electrolyte that provides a porous medium for the transfer of the electrical charge ions from the storage anode to be chemically bound at the cathode, while also acting as an insulator or separator between each of the electrodes. The lithium-ion pouch battery cell 100 may be recharged by using electric current to forcibly separate the lithium ions from the cathode and send them through the electrolyte and back to the anode. Within the present context, the stacked anode, cathode and electrolyte form an active region (i.e., the electrode stack 112) where electric current is generated, and are contained completely within the joined aluminum foil surfaces 102, 104.

Although the lithium-ion pouch battery cell 100 used in the energy battery variant is of generally planar construction, in actuality the lithium-ion pouch battery cell 100 may assume an edgewise trapezoidal profile. The battery assembly 10 made is not limited to the embodiments and examples depicted herein, and various changes and modifications are possible without departing from the scope of the present disclosure. For example, numerous individual alternating positive and negative electrodes may be grouped within each electrode stack 112 and spaced apart from one another along the stacking direction to be kept electrically isolated by non-conductive separators (not shown). Leads from each of the negative electrodes are gathered together inside the pouch 101 of lithium-ion pouch battery cell 100 to feed the tab 108, while leads from each of the positive electrodes are likewise gathered together to feed the tab 106.

Figure 4:
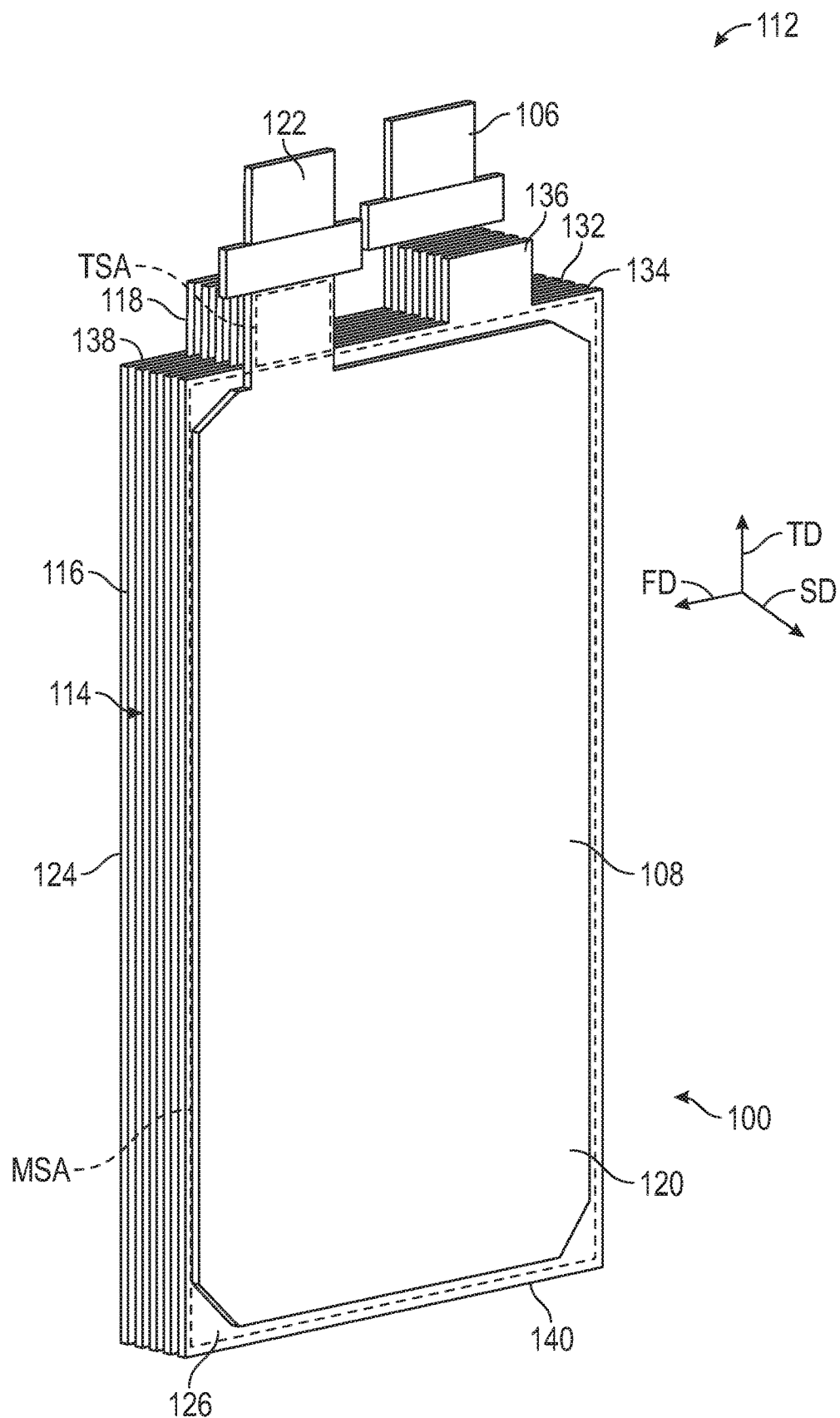
FIG. 4 is a schematic perspective view of a portion of the lithium-ion pouch battery cell shown in FIG. 3, depicting an electrode stack and a heat-rejecting lead tab in thermal communication with the electrode stack.
Figure 5:
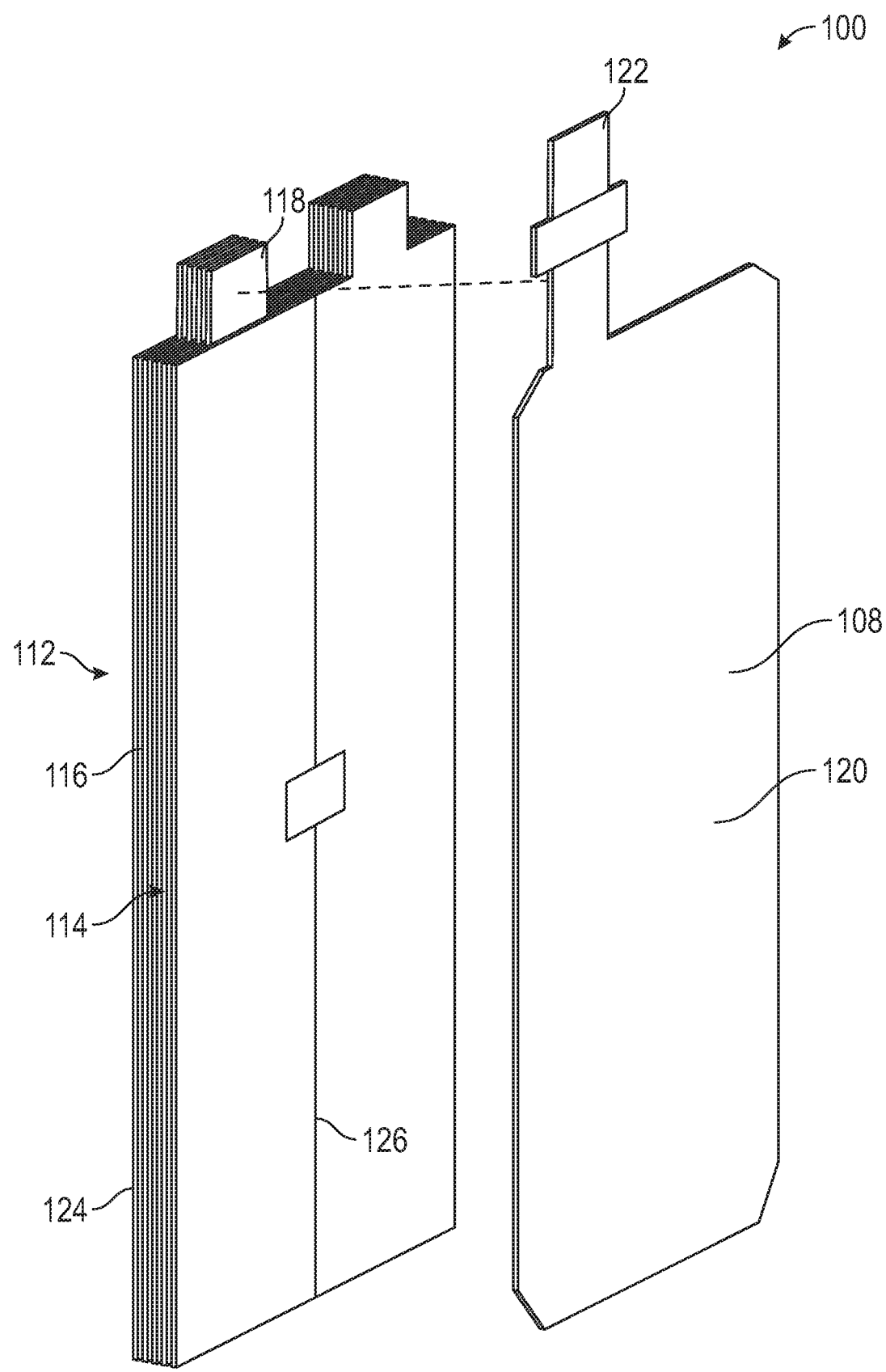
FIG. 5 is a schematic exploded perspective view of the electrode stack and the heat-rejecting lead tab shown in FIG. 4.

With reference to FIGS. 4 and 5, the lithium-ion battery cell 100 includes a plurality of electrodes 114 stacked together to form at least part of the electrode stack 112. Each of the electrodes 114 includes a main electrode layer 116 and an electrode tab 118 protruding from the main electrode layer 116. In the depicted embodiment, the electrode tab 118 protrudes directly from the main electrode layer 116. The electrode tab has a tab surface area TSA, and the main electrode layer 116 has a main surface area MSA. The main surface area MSA is greater than the tab surface area TSA. The heat-rejecting lead tab coupled to the plurality of electrodes 114. The heat-rejecting lead tab 108 covers (most or the entire) tab surface area TSA of the electrode tab 118 and the main surface area MSA of the main electrode layer 116 to facilitate heat transfer from the electrode stack 112 to the heat-rejecting lead tab 108. In the depicted embodiment, the electrodes 114 are anode electrodes. Accordingly, the main electrode layers 116 may be referred to as main anode layers, and the electrode tab 118 may be referred to as the anode tabs. The lithium-ion pouch battery cell 100 further includes a plurality of cathode electrodes 132. Each of the cathode electrodes 132 includes a main cathode layer 134 and a cathode tab directly protruding from the main cathode layer 134. The electrode tab 118 (i.e., the anode tab) is spaced apart from the cathode tab 136 along a first direction FD.

The heat-rejecting lead tab 108 includes a main lead body 120 and a heat-rejecting protrusion 122 coupled to the main lead body 120. In the depicted embodiment, the heat-rejecting protrusion 122 protrudes directly from the main lead body 120. The heat-rejecting protrusion 122 covers (most or the entire) the tab surface area TSA of the electrode tab 118 to facilitate heat transfer from the electrode stack 112 to the heat-rejecting lead tab 108. The heat-rejecting lead tab 108 is wholly or partly made a thermally-conductive (and electrically-conductive) material, such as aluminum, copper, or nickel. The main lead body 120 covers (a majority or the entirety) of the main surface area MSA of the main electrode layer 116 to facilitate heat transfer from the electrode stack 112 to the heat-rejecting lead tab 108. The electrodes 114 includes an innermost electrode 126 and an outermost electrode 124 opposite the innermost electrode 126. The heat-rejecting lead tab 108 is closer to the innermost electrode 126 than to the outermost electrode 124. The innermost electrode 126 is spaced apart from the outermost electrode 124 along a second direction SD. The second direction SD is perpendicular to the first direction FD. The electrode stack 112 defines a first stack end 138 and a second stack end 140 opposite the first stack end 138. The first stack end 138 is spaced apart from the second stack end 140 along a third direction TD. The cathode tabs 136 are closer to the first stack end 138 than to the second stack end 140. The anode tabs (i.e., the electrode tabs 118) are closer to the first stack end 138 than to the second stack end 140.

As shown in FIG. 5, the heat-rejecting lead tab 108 is directly coupled to the electrode tab 118 of one of the electrodes 114. Specifically, the heat-rejecting lead tab 108 is directly coupled to the electrode tab 118 of the innermost electrode 126. Thus, the heat-rejecting lead tab 108 is closer to the innermost electrode 126 than to the outermost electrode 124. In particular, the heat-rejecting protrusion 122 of the heat-rejecting lead tab 108 is directly coupled to the electrode tab 118 of one of the electrodes 114 (e.g., the innermost electrode 126 or the outermost electrode 124). For example, the heat-rejecting protrusion 122 is (ultrasonic or laser) welded to the electrode tab 118 of one of the electrodes (e.g., the outermost electrode 126). The heat-rejecting protrusion 122 has a planar configuration to facilitate heat transfer from the electrode stack 112 to the heat-rejecting lead tab 108. The main lead body 120 has a planar configuration to facilitate heat transfer from the electrode stack 112 to the heat-rejecting lead tabs 108.

Figure 6:
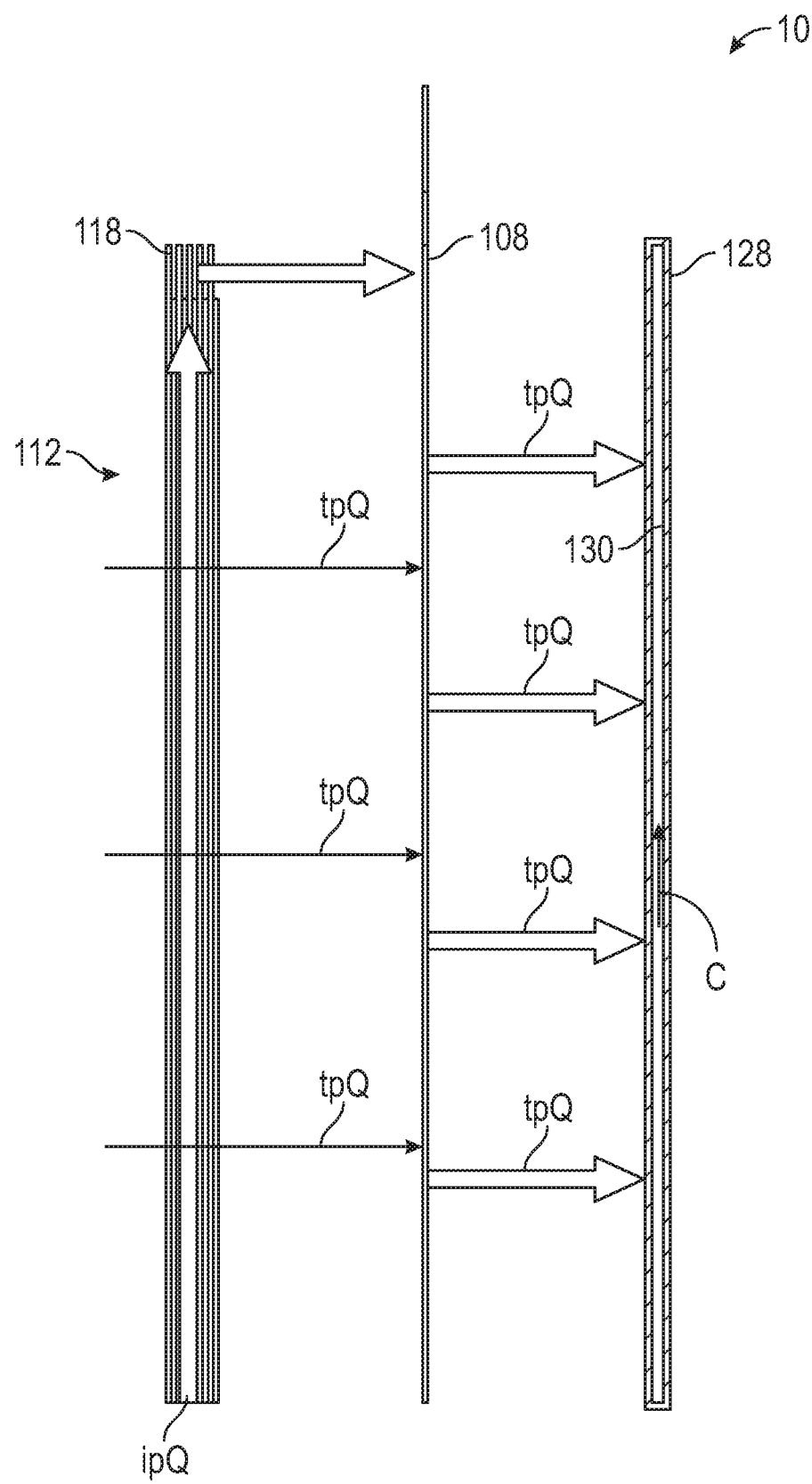
FIG. 6 is a schematic exploded side of the electrode stack and the heat-rejecting lead tab in thermal communication with a cooling plate of the battery assembly.

With reference to FIG. 6, the battery assembly 10 further includes a cooling plate 128 in thermal communication with the lithium-ion pouch battery cell 100 to allow heat transfer from the lithium-ion pouch battery cell 100 to the cooling plate 128. The cooling plate 128 defines a channel 130 configured to receive a coolant C. The heat-rejecting lead tab 108 is disposed between the cooling plate 128 and the electrode stack 112 to facilitate heat transfer from the electrode stack 112 to the cooling plate 128 through the heat-rejecting lead tab 108. In other words, the heat-rejecting tab 108 facilities through-plane heat transfer tpQ. In addition, the configuration of the electrode stack 112 allows in-plane heat transfer ipQ. Accordingly, the battery assembly 10 described in this disclosure allows in-plane heat transfer ipQ and through-plane heat transfer tpQ. The cooling plate 128 is closer to the innermost electrode 126 than to the outermost electrode 124.

While the best modes for carrying out the disclosure have been described in detail, those familiar with the art to which this disclosure relates will recognize various alternative designs and embodiments for practicing the disclosure within the scope of the appended claims.

What is claimed is:

1. A battery assembly, comprising:
a cooling plate defining a channel, wherein the channel is configured to receive a coolant;
a plurality of electrodes stacked together to form an electrode stack, the cooling plate being in thermal communication with the electrode stack, each of the electrodes includes a main electrode layer and an electrode tab protruding from the main electrode layer, the electrode tab has a tab surface area, and the main electrode layer has a main surface area;
a heat-rejecting lead tab coupled to the plurality of electrodes;
wherein the heat-rejecting lead tab covers the tab surface area of the electrode tab and the main surface area of the main electrode layer to facilitate heat transfer from the electrode stack to the heat-rejecting lead tab;
wherein the plurality of electrodes includes an innermost electrode and an outermost electrode opposite the innermost electrode;
wherein the heat-rejecting lead tab includes a main lead body and a heat-rejecting protrusion coupled to the main lead body, and the heat-rejecting protrusion covers the tab surface area of the electrode tab; and
wherein the cooling plate is coupled to the main lead body of the heat-rejecting lead tab.

2. The battery assembly of claim 1, wherein the heat-rejecting protrusion covers an entirety of the tab surface area of the electrode tab to facilitate heat transfer from the electrode stack to the heat-rejecting lead tab.

3. The battery assembly of claim 2, wherein the heat-rejecting lead tab comprises a thermally-conductive material.

4. The battery assembly of claim 3, wherein the main lead body covers a majority of the main surface area of the main electrode layer to facilitate heat transfer from the electrode stack to the heat-rejecting lead tab.

5. The battery assembly of claim 4, wherein and the heat-rejecting lead tab is closer to the innermost electrode than to the outermost electrode.

6. The battery assembly of claim 5, wherein the heat-rejecting lead tab is directly coupled to the electrode tab of one of the plurality of electrodes.

7. The battery assembly of claim 6, wherein the heat-rejecting protrusion of the heat-rejecting lead tab is directly coupled to the electrode tab of one of the plurality of electrodes.

8. The battery assembly of claim 7, wherein the heat-rejecting protrusion is welded to the electrode tab of one of the plurality of electrodes, the heat-rejecting protrusion protrudes directly from the main lead body, and the electrode tab protrudes directly from the main electrode layer.

9. The battery assembly of claim 8, wherein the heat-rejecting protrusion has a planar configuration to facilitate heat transfer from the electrode stack to the heat-rejecting lead tab.

10. The battery assembly of claim 9, wherein the main lead body has a planar configuration to facilitate heat transfer from the electrode stack to the heat-rejecting lead tab.

11. A battery assembly, comprising:
a cooling plate defining a channel, wherein the channel is configured to receive a coolant;
a lithium-ion pouch battery cell in thermal communication with the cooling plate, wherein the lithium-ion pouch battery cell includes:
a plurality of electrodes stacked together to form an electrode stack, each of the electrodes includes a main electrode layer and an electrode tab protruding from the main electrode layer, the electrode tab has a tab surface area, and the main electrode layer has a main surface area;
a heat-rejecting lead tab coupled to the plurality of electrodes; and
wherein the heat-rejecting lead tab covers the tab surface area of the electrode tab and the main surface area of the main electrode layer to facilitate heat transfer from the electrode stack to the heat-rejecting lead tab;
wherein the plurality of electrodes includes a plurality of anode electrodes and a plurality of cathode electrodes, each of the plurality of anode electrodes includes an anode tab, each of the cathode electrodes includes a cathode tab, the electrode tab is one of the anode tab and the cathode tab, the anode tab is spaced apart from the cathode tab along a first direction, the plurality of electrodes includes an innermost electrode and an outermost electrode opposite the innermost electrode, the innermost electrode is spaced apart from the outermost electrode along a second direction, the second direction is perpendicular to the first direction, each of the plurality of electrodes is elongated along a third direction, the third direction is perpendicular to the first direction, and the third direction is perpendicular to the second direction;
wherein the heat-rejecting lead tab includes a main lead body and a heat-rejecting protrusion coupled to the main lead body, and the heat-rejecting protrusion covers the tab surface area of the electrode tab; and
wherein the cooling plate is coupled to the main lead body of the heat-rejecting lead tab.

12. The battery assembly of claim 11, wherein the heat-rejecting protrusion covers an entirety of the tab surface area of the electrode tab to facilitate heat transfer from the electrode stack to the heat-rejecting lead tab.

13. The battery assembly of claim 12, wherein the heat-rejecting lead tab comprises a thermally-conductive material.

14. The battery assembly of claim 13, the main lead body covers a majority of the main surface area of the main electrode layer to facilitate heat transfer from the electrode stack to the heat-rejecting lead tab.

15. The battery assembly of claim 14, wherein the heat-rejecting lead tab is closer to the innermost electrode than to the outermost electrode.

16. The battery assembly claim 15, wherein the heat-rejecting lead tab is directly coupled to the electrode tab of one of the plurality of electrodes, the heat-rejecting protrusion of the heat-rejecting lead tab is directly coupled to the electrode tab of one of the plurality of electrodes, the heat-rejecting protrusion is welded to the electrode tab of one of the plurality of electrodes, the heat-rejecting protrusion protrudes directly from the main lead body, and the electrode tab protrudes directly from the main electrode layer, the heat-rejecting protrusion has a planar configuration to facilitate heat transfer from the electrode stack to the heat-rejecting lead tab, the main lead body has a planar configuration to facilitate heat transfer from the electrode stack to the heat-rejecting lead tab, the heat-rejecting lead tab is closer to the innermost electrode than to the outermost electrode, the main surface area is greater than the tab surface area, the electrode stack defines a first stack end and a second stack end opposite the first stack end, the first stack end is spaced apart from the second stack end along the third direction, the cathode tab is closer to the first stack end than to the second stack end, the anode tab is closer to the first stack end than to the second stack end, and the lithium-ion pouch battery cell further includes a pouch enclosing the electrode stack.

17. The battery assembly of claim 1, wherein an entirety of the cooling plate is closer to the innermost electrode than to the outermost electrode, and the heat-rejecting lead tab is disposed between an entirety of the electrode stack and the entirety of the cooling plate to facilitate heat transfer from the electrode stack to the cooling plate through the heat-rejecting lead tab.

18. The battery assembly of claim 1, wherein the plurality of electrodes includes a plurality of anode electrodes and a plurality of cathode electrodes, each of the plurality of anode electrodes includes an anode tab, each of the cathode electrodes includes a cathode tab, the electrode tab is one the anode tab and the cathode tab, the anode tab is spaced apart from the cathode tab along a first direction, the plurality of electrodes includes an innermost electrode and an outermost electrode opposite the innermost electrode, the innermost electrode is spaced apart from the outermost electrode along a second direction, the second direction is perpendicular to the first direction, each of the plurality of electrodes is elongated along a third direction, the third direction is perpendicular to the first direction, and the third direction is perpendicular to the second direction;
  wherein the heat-rejecting lead tab is disposed between the cooling plate and the electrode stack such that the heat-rejecting lead tab is spaced apart from the electrode stack along the second direction to facilitate through-plane heat transfer along the second direction; and
  wherein the channel is elongated along the third direction to allow the coolant to flow in the third direction, thereby facilitating in-plane heat transfer along the third direction.

19. The battery assembly of claim 11, wherein the electrode stack defines a first stack end and a second stack end opposite the first stack end, the first stack end is spaced apart from the second stack end along the third direction, the cooling plate has a planar shape, the cooling plate has a plate body, the channel is entirely disposed inside the plate body, and the cooling plate is elongated along the third direction.

20. A battery assembly, comprising:
a cooling plate defining a channel, wherein the channel is configured to receive a coolant;
a lithium-ion pouch battery cell in thermal communication with the cooling plate, wherein the lithium-ion pouch battery cell includes:
a plurality of electrodes stacked together to form an electrode stack, each of the electrodes includes a main electrode layer and an electrode tab protruding from the main electrode layer, the electrode tab has a tab surface area, and the main electrode layer has a main surface area;
a heat-rejecting lead tab coupled to the plurality of electrodes; wherein the heat-rejecting lead tab covers the tab surface area of the electrode tab and the main surface area of the main electrode layer to facilitate heat transfer from the electrode stack to the heat-rejecting lead tab;
wherein the plurality of electrodes includes a plurality of anode electrodes and a plurality of cathode electrodes, each of the plurality of anode electrodes includes an anode tab, each of the cathode electrodes includes a cathode tab, the electrode tab is one of the anode tab and the cathode tab, the anode tab is spaced apart from the cathode tab along a first direction;
wherein the plurality of electrodes includes an innermost electrode and an outermost electrode opposite the innermost electrode;
wherein the innermost electrode is spaced apart from the outermost electrode along a second direction,
wherein the second direction is perpendicular to the first direction,
wherein each of the plurality of electrodes is elongated along a third direction;
wherein the third direction is perpendicular to the first direction;
wherein the third direction is perpendicular to the second direction;
wherein the entirety of the cooling plate has a planar shape;
wherein the cooling plate has a plate body;
wherein the plate body is elongated along the third direction;
wherein the channel is entirely disposed inside the plate body;
wherein the heat-rejecting lead tab includes a main lead body and a heat-rejecting protrusion coupled to the main lead body, and the heat-rejecting protrusion covers the tab surface area of the electrode tab; and
wherein the cooling plate is coupled to the main lead body of the heat-rejecting lead tab.

* * * * *